United States Patent [19]

Chang

[11] Patent Number: 5,024,860
[45] Date of Patent: Jun. 18, 1991

[54] ROCKET MOTOR INSULATION USING PHOSPHONITRILIC ELASTOMERIC COMPOSITIONS

[75] Inventor: Suae-Chen Chang, Baton Rouge, La.

[73] Assignee: Ethyl Corporation, Richmond, Va.

[21] Appl. No.: 356,183

[22] Filed: May 24, 1989

[51] Int. Cl.$^5$ ............................................. B05D 7/22
[52] U.S. Cl. .................... 427/230; 427/239; 427/388.2
[58] Field of Search ...................... 427/230, 388.2, 239

[56] References Cited

U.S. PATENT DOCUMENTS 3,890,092 6/1975 Garner ................................. 8/115.6
4,064,095 12/1977 Oberster ............................ 260/37 R

FOREIGN PATENT DOCUMENTS 0009642 4/1980 European Pat. Off. .

*Primary Examiner*—Janyce Bell
*Attorney, Agent, or Firm*—Richard J. Hammond

[57] ABSTRACT

A process for forming a low smoke, low erosion rocket motor insulation comprising mixing organic fiber selected from the group polyaramid and polybenzimidazole; an inorganic powder filler; a vulcanizable hydrocarbon elastomer and a non-fluorinated phosphazene polymer of the formula

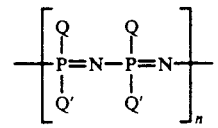

where Q and Q' are the same or different and are substituted or unsubstituted alkoxy or aryloxy and Q" is a group having olefinic unsaturation.

10 Claims, No Drawings

ROCKET MOTOR INSULATION USING PHOSPHONITRILIC ELASTOMERIC COMPOSITIONS

This invention relates to the use of phosphonitrilic elastomers as matrix materials for low smoke insulation of rocket motor casings. More particularly, this invention relates to non-fluorine containing phosphonitrilic elastomers admixed with aramide or benzimidazole fibers to provide low smoke rocket motor insulation.

The combustion of rocket propellants, in the confined volume of the thrust chamber, their ultimate release through one or more orifices usually occur under high temperatures and extremely high velocity. This places considerable stress and strain upon the gas escape orifice and other portions of the rocket structure. While the combustion of the rocket propellants is usually of short duration, the temperatures and pressure generated can destroy even the strongest and best high temperature alloys of iron, titanium, chromium, nickel, beryllium and the like unless they are protected from these conditions. As a consequence of such structural failure the rocket may be totally destroyed or only a portion such as the gas escape orifice may be destroyed. In the latter case the rocket proceeds in an erratic uncontrollable path and must be destroyed.

Attempts have been made to protect those parts of the rocket structure which may be exposed to the high temperature and erosive flow conditions of the burning propellant.

The best rocket insulation materials previously known to the art are elastomeric polymers reinforced with asbestos. Such systems are capable of enduring for a time sufficient to allow complete combustion of the propellant. Asbestos-reinforced elastomeric insulation systems are the subject of U.S. Pat. No. 3,421,970, to Daley et al, U.S. Pat. No. 3,347,047, to Hartz et al and U.S. Pat. Nos. 4,492,779 and 4,600,732 to Junior et al. Those patents are hereby incorporated herein by reference.

Environmental and health concerns have led manufacturers to seek an acceptable replacement for the asbestos in rocket motor case insulation. One alternative elastomeric insulation contains aramid polymer fibers in combination with a powder filler. The polyaramid fiber reinforced materials, however, have been found less erosion resistant than asbestos reinforced materials. Polybenzimidazole fibers are known to be useful for applications requiring high temperature resistance including rocket motor casing insulation. However, smoke generation, always disadvantageously high for these elastomeric systems, is not significantly altered by such fibers.

In its most generic form, this invention consists of the discovery that by using non-fluorinated vulcanizable phosphonitrilic elastomers in combination with aramid or benzimidazole polymer fibers a low smoke rocket motor insulation is produced. Further, even when the relatively high smoke, prior art vulcanizable hydrocarbon elastomers are added to such phosphonitrilic elastomeric composition the smoke generation is surprisingly low.

Briefly, the invention contemplates the radiation, peroxide or sulfur accelerated cures of phosphazene polymer-containing compositions in which most of the chlorine atoms in linear $(NPCl_2)_n$ polymer have been replaced with substituents such as those described in the prior art, e.g., alkoxy, and/or aryloxy groups which may be substituted in the manner taught in, for example, U.S. Pat. Nos. 3,370,020; 3,852,794; 3,856,713 and 3,970,533 the disclosures of which are intended to be incorporated herein by reference. The replacement of the remaining chlorine atoms in linear $(NPCl_2)_n$ polymers with substituents which possess at least some unsaturation which serve as a cure site is also described in these patents.

The following structural formula may be taken as one way of illustrating the polyphosphazenes useful in the present invention, although it is to be understood that the distribution of the Q, Q' and Q" groups may be regular or irregular and that the phosphazene polymer may be either linear or branched:

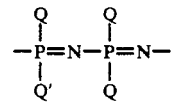

in which Q, Q' and Q" represent monovalent groups randomly distributed along the —P=N— backbone. The Q and Q' groups are preferably substituted or unsubstituted alkoxy and aryloxy groups which are relatively inert or unreactive to the various curing accelerators as compared to the Q" groups which contain some unsaturation, the total of Q and Q' groups being sufficient to replace at least 90% and preferably at least 95% but not more than 99.9% of the Cl atoms originally present in the linear $(NPCl_2)_n$ polymer. The Q" groups are groups with some unsaturation, e.g., a group represented by —O—R—R' in which R is $C_1$ to $C_6$ linear or branched alkylene or substituted or unsubstituted arylene and R' is a group which includes some olefinic unsaturation, e.g., $C_1$ to $C_6$ linear or branched alkenyl groups such as vinyl, allyl, crotyl, or the like. The number of Q" groups are distributed randomly in the phosphazene, preferably being between 0.1 and 5% of the total of Q plus Q' plus Q". The Q and Q' groups may be either the same or they may differ and each may represent more than one saturated group. Because of the greater reactivity exhibited by the Q" groups, as compared with the Q and Q' groups, the Q" groups serve as cure sites for cross linking and vulcanization.

Fluorine is absent from both Q and Q', thereby reducing the cost of the polyphosphazenes and the compositions of this invention.

Particularly preferred phosphonitrilic elastomers for use in this invention are those where Q and Q' are the same or different and are methoxy, ethoxy, amyloxy, phenoxy, m- or p-cresyloxy, p-ethylphenoxy, and the like and Q" is o-allylphenoxy.

Illustrative of the method of preparation useful to prepare the phosphonitrilic elastomers used in the compositions of the present invention is the following reaction sequence where various phenols are illustrative of the groups Q, Q' and Q".

Preparation of Sodium Aryloxides

The amounts of reactants (based on 200 g of $(NPCl_2)_n$ chloropolymer) are calculated as follows, 200 g of chloropolymer being considered equivalent to 200/116, i.e., 1.72 moles $(NPCl_2)_n$:

| Theory for aryloxides | 2 moles/mol of $(NPCl_2)_n$ = 3.44 moles (2 × 1.72) |
|---|---|

-continued

| | |
|---|---|
| Actual amount of aryloxides provided | 3.82 mole (11% excess) |
| Amount of sodium provided | 3.83 mole (88 g) |
| The following amounts of phenols were provided: | |
| phenol | 194 g (60%) |
| p-ethylphenol | 207.4 g (50%) |
| o-allylphenol | 56 g (12%) |

The phenols and sodium are weighed separately into bottles in which they are mixed with anhydrous tetrahydrofuran (THF) and capped. These operations are carried out in a Dry-Box. About 1200 ml of THF is added to the phenols and about 150 ml of THF was added to the sodium.

The Na/THF is added to three-necked flask equipped with a stirrer, dropping funnel and an argon or nitrogen purge line. Under the purge atmosphere, the phenols in THF are added dropwise with stirring over about 2 hours at room temperature, the reaction being exothermic. After addition of the phenols, the reaction mixture is stirred at room temperature overnight. Generally, after 8 hours stirring the sodium has all reacted. A yellow to brown solution of the phenolates is obtained.

Derivation of $(NPCl_2)_n$

The 200 g of linear $(NPCl_2)_n$ in benzene (total volume is about 2400 ml) is added rapidly (20 to 30 minutes) to the aryloxides prepared as illustrated above in 1200 ml of THF and 2500 ml of benzene in the reactor. The reaction mixture is then stirred at about 300° F. for 24 hours. Upon cooling, the polymer is coagulated by pouring into a 10 gallon can containing 2 gallons of methanol with agitation. The solvents are then drawn off. Additional methanol may be added if the polymer does not separate cleanly from the solution. The solid, as free as possible of solvent, is then desalted by washing with water. The resulting chlorine-free polymer is dried at 50° C. to 60° C. under vacuum.

The elastomeric phosphorous-containing polymers are compounded as illustrated below with certain polymeric, organic fibers. These fibers obtained from polymers of benzimides or of aramides are useful in the process of this invention in about 1 to about 60% by weight based on phosphonitrilic elastomer. Preferably the amount of polymeric organic fiber is from about 25 to about 50% by weight, most preferably 30–50% by weight based on phosphonitrilic elastomers. Amounts of fiber greater or lesser than the range noted above impair the physical properties of the low smoke compositions when used in the high temperature, high pressure environments illustrative of firing rocket motors.

The polyaramid fibers used in the present invention are commercially available in yarn form under the trademarks "Fiber B", "Kevlar", "DP-01", and "Nomex", as well as others. Aramid is the generic name for fibers made from the condensation product of isophthalic or terephthalic acid and m- or p-phenylenediamine. "Fiber B" and "Kevlar" are generally understood to be products of the condensation of terephthalic acid and p-phenylenediamine while "Nomex" is understood to be a product of the condensation of isophthalic acid and m-phenylenediamine. Aramid is defined as "a manufactured fiber in which the fiber-forming substance is a long-chain synthetic aromatic polyamide in which at least 85% of the amide linkages are attached directly to two aromatic linkages." Further details of the fiber are shown in U.S. Pat. No. 3,393,210, incorporated herein by reference.

The polyaramid fibers which are usable herein are bare (so-called grey) and then chopped into short fibers so as to form the floc.

The grey polyaramid fibers are used in the form of a floc (flock) which is short lengths of fibers randomly disposed (oriented). The grey fibers more readily separate into individual discrete filaments when incorporated into the phosphazene mixture. The filaments may be of any length, up to about 5 inches in length, preferably about ⅛ (0.125) to 3 inches, most preferably about ¼ to 1 inch.

The polybenzimidazole fibers of the present invention are commercially available from Celanese Fibers Marketing Corporation, P.O. Box 32414, Charlotte, N.C. 28232, under the trademark CELANESE PBI. The term "polybenzimidazole polymer" (or "PBI") as used herein means a polymer having recurring units of the formula:

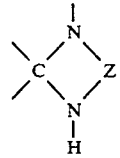

wherein —Z— is an aromatic nucleus and the nitrogen atoms forming the benzimidazole ring are attached to adjacent carbon atoms of the aromatic nucleus.

In addition to the above, tetramino aromatic compounds containing a pair of ortho disposed amino groups can be reacted with either a diphenylester or an anhydride of an aromatic dicarboxylic acid to form a polybenzimidazole of the head-head, tail-tail variety. These polymers may be represented as consisting essentially of recurring units of the formula:

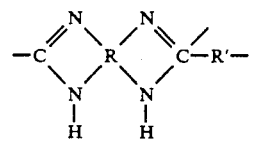

wherein R is a symmetrically tetrasubstituted aromatic nucleus and the nitrogen atoms forming each benzimidazole ring are attached to adjacent carbon atoms of the aromatic nucleus, R' being a member of the class consisting of (I) a carboxcyclic aromatic ring and (II) a heterocyclic ring from the class consisting of (A) pyridine, (B) pyrazine, (C) furan and (D) quinoline. Illustrative polybenzimidazole polymers include poly-2,5,6-benzimidazole, poly-2,2'-(m-phenylene)-5,5'-bibenzimidazole, poly-2,6-(m-phenylene)-diimidazobenzene, poly-2,2'-pyridylene-3",5")-bibenzimidazole, poly-2,2'-(furylene-2",5") -5-5'-bibenzimidazole, poly-2,2'-(p-phenylene)-5,5'-bibenzimidazole, poly-2,6-(p-phenylene)-diimidazobenzene, poly-2,2-biphenylene-4")-5,5'-bibenzimidazole, poly-2,2'-diphenylene -2",2'")-5,5-bibenzimidazole, and poly-2,2-napthalene-1",6")-5,5'-bibenzimidazole. These and other polybenzimidazole polymers suitable for use in the present invention are disclosed in U.S. Pat No. Re. 26,065. That patent is hereby incorporated herein by reference.

As a third component required of the low smoke insulating composition herein is an inorganic powder filler. These fillers, more particularly described below, are useful at about 1 to about 25% by weight based on the phosphonitrilic elastomer. Preferably, such filler is used at about 5 to 25% by weight, most preferably at about 10 to about 25% by weight based on the phosphonitrilic polymer.

The term "inorganic powder filler" as used herein means a combustion resistant powdered material with a particle size range, expressed as specific surface area, of from about 1 meter$^2$/gram to about 200 meter$^2$/gram. Suitable powder fillers include silica, iron oxide, titanium oxide, milled glass, carbon, ceramic clay, and mixtures thereof. Silica powder is preferred because of its low cost and because of its relatively low absorption of the liquid components of the insulating material, which minimizes drying of the composition during mixing. The preferred particle size is at least 20 millimicrons. One material useful herein is a silicon called HI-SIL EP, sold by PPG Industries, Inc., Pittsburgh, Pa.

The vulcanizable hydrocarbon elastomer useful in the present invention may be natural (Hevea) rubber, a conjugated diolefine polymer synthetic rubber or mixtures of any of them including their reclaims. Such conjugated diolefine polymer synthetic rubbers are polymers of butadienes-1,3, e.g., butadiene-1,3, isoprene, 2,3-dimethylbutadiene-1,3, and polymers of mixtures thereof and copolymers of mixtures of one or more such butadienes-1,3, with one or more other polymerizable compounds which are capable of forming rubber copolymers with butadienes-1,3, for example, up to 60% by weight of such mixture of one or more monoethylenic compounds which contain a $CH_2=C<$ group where at least one of the disconnected valences is attached to an electro-negative group, that is, a group which substantially increases the electrical dissymmetry or polar character of the molecule. Examples of compounds which contain a $CH_2=C<$ group and are copolymerizable with butadienes-1,3 are aryl olefines, such as styrene, vinyl toluene, alpha methyl styrene, chlorostyrene, dichlorostyrene, vinyl napthalene; the alpha methylene carboxylic acids and their esters, nitriles and amides, such as acrylic acid, methyl acrylate, methyl methacrylate, acrylonitrile, methacrylonitrile, methacrylamide; vinyl pyridines, such as 2-vinyl pyridine, 2-methyl-5-vinyl pyridine; methyl vinyl ketone. Examples of such conjugated diolefine polymers are polyisoprene, butadiene-styrene copolymers (SBR) and butadiene-acrylonitrile copolymers.

The use of such elastomer is not absolutely required for the process of this invention. However, since the cost of phosphonitrilic polymers is dramatically greater than any of the above noted hydrocarbon elastomers, their use provides a more cost effective formulation as long as the quantity of such material does not adversely effect the smoke generation of the low smoke formulation of this invention. As such the amount of such hydrocarbon elastomer may range between about 0 and about 75% by weight of the phosphonitrilic polymer. Preferably, this elastomer is used at about 20 to about 60% more preferably 20 to about 55% by weight based on the phosphonitrilic elastomer.

The method of the present invention may use additional materials that are conventional compounding and vulcanizing ingredients such as carbon black, rubber processing or softening oils which may be added as such or may be present from oil-extended rubbers, antioxidants, sulfur, zinc oxide and accelerators.

The phosphonitrilic elastomeric composition described herein can be prepared by the following procedure:

1. 100 parts of EYPEL ®-A is added to a Banbury mixer (room temp) set at slow speed with cold water on full.
2. After three minutes of slow continuous mixing, 40 parts of Hi-Sil 233 is added in increments followed by 10.0 parts of silastic HA-2 and 2.0 parts of stearic acid. The mix temperature is adjusted to approximately 135° F.
3. After twelve more minutes of slow, continuous mixing, the mix temperature is controlled to approximately 225° F.
4. Mixing is stopped after fifteen minutes and the mixture is discharged into a container.
5. The mixture is then transferred to a large mill (room temp) and 50 parts of PBI fibers and 1 part of Vulcup 40KE is added to the mill. The resulting mix is refined to approximately 0.010 inch thickness by passing through a very tight roll mill five times.

Excessive mixing in part 5 leads to further fiber shortening. While critical fiber length is not known, it is believed that the longer the average fiber length, the more erosion resistant the insulation will be.

EYPEL ®-A is a registered trademark of the Ethyl Corporation for the polyphosphazene where Q and Q' are phenoxy and p-ethyl phenoxy and Q" is o-allylphenoxy.

The insulation is applied to a rocket motor interior in the same manner as asbestos-reinforced elastomeric insulation. See for example U.S. Pat. No. 3,421,970. The uncured material is hand-washed with methylene chloride and allowed to dry. It is then "layed-up" into a rocket motor casing that has been primed with a bond promoter.

The lining material is oriented so the polymer fibers are circumferentially disposed with respect to the casing. The insulation is compressed into place with a pressurized bag and cured by heating the assembly as indicated in the Examples.

The following examples are illustrative only and are not intended to limit the scope of the invention in any way. All quantities are expressed as parts by weight unless otherwise stated.

TABLE

| | Comparative Examples[a] | | | Examples[b] | | | |
|---|---|---|---|---|---|---|---|
| | 1 | 2 | 3 | 1 | 2 | 3 | 4 |
| EYPEL ® -A gum | — | — | — | 100 | 50 | 50 | 100 |
| Natsyn 2200 | 100 | 100 | 100 | — | — | — | — |
| Natsyn 2210 | — | — | — | — | — | 50 | — |
| Nordel 1320 | — | — | — | — | 50 | — | — |
| Hi-Sil | 5 | 65 | 45 | 40 | 40 | 40 | 40 |
| PBI fiber | — | — | 50 | 50 | 50 | 50 | — |
| Kevlar fiber | — | 20 | — | — | — | — | 50 |
| Asbestos | 100 | — | — | — | — | — | — |

TABLE-continued

|  | Comparative Examples[a] | | | Examples[b] | | | |
| --- | --- | --- | --- | --- | --- | --- | --- |
|  | 1 | 2 | 3 | 1 | 2 | 3 | 4 |
| Curing Conditions | 170° F./ 16 hrs | 170° F./ 16 hrs | 170° F./ 16 hrs | 340° F./ 30 min | 340° F./ 30 min | 340° F./ 30 min | 340° F./ 30 min |
| Relative Flexibility[c] (cured slabs) | 1 | 1 | 1 | 2 | 4 | 3 | 5 |
| $M_L$ (1 + 4) | — | — | — | 130.4 | 108.5 | 79.6 | 88.4 |
| $M_H$ | — | — | — | 38 | 55.5 | 45.2 | 58.5 |
| $M_L$ | — | — | — | 13.3 | 15.6 | 13 | 26.4 |
| $O_2$/Methane Torch Test |  |  |  |  |  |  |  |
| Time required to self extinguish after burning for 15 sec in the flame | 80 sec | >2 min | >2 min | 5 sec | >2 min | 65 sec | 5 sec |
| Flame propagation[d] | 5 | 6 | 4 | 1 | 3 | 2 | 1 |
| Char Swell | yes (at least twice as much) | not noticeable | not noticeable | no | not noticeable | not noticeable | no |
| Relative smoke density[e] | 4 | 4 | 4 | 1 | 2 | 3 | 1 |
| Material lost after burn[e] | 6 | 5 | 1 | 3 | 2 | 1 |  |

[a] As processing and vulcanizing aids, these formulations contain zinc oxide, 5 parts; Agcritic Spar, 1 part; sulfur 2.5 parts; B-L-E 2.5 liquid, 0.5 parts; and stearic acid, 2 parts. See U.S. Pat. No. 4,492,779 and 4,600,732 Example 1 in each patent.
[b] As processing and vulcanizing aids, these formulations contained Vulcup 40KE, 1 part and Silastic HA-2, 10 parts.
[c] 1 - most flexible 5 - least flexible (boardy)
[d] 1 - least flame propagation 5 - most flame propagation
[e] 1 - smallest amount of materials lost 6 - largest amount of materials lost
[f] 1 - lowest smoke density 4 - highest smoke density The above compositions were molded into 75 mil thick, 6"×6" slabs and press-cured for 30 minutes at 340° F. The cured slabs were then cut into ½" wide strips. The torch test was done by burning cured strips of samples with an oxygen/methane torch for 15 sec. and observing the time required for the flame on the samples to be self-extinguished. The extent of flame propagation throughout the sample, the resulting char swell, the smoke generated during burn and the amount of materials lost after burn were also recorded.

It was generally considered that if a specimen could withstand this test it was composed of a satisfactory insulating material.

I claim:
1. A process for producing a low smoke, insulating liner for rocket motor casings comprising the steps of
   a. mixing a vulcanizable composition comprising
   1) from about 1 to about 60% by weight of an organic polymer fiber selected from the group polyaramid, polybenzimidazole and mixtures thereof;
   2) from about 1 to about 25 percent by weight of an inorganic powder filler having a specific surface area of from about 1 meter$^2$/gram to about 200 meter$^2$/gram;
   3) from about 0 to about 75 percent by weight of a vulcanizable hydrocarbon elastomer and;
   4) a non-fluorinated phosphazene polymer of the formula

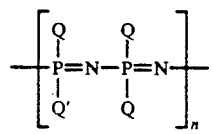

where Q and Q' are the same or different and are substituted or unsubstituted alkoxy or aryloxy and Q" is a group having olefinic unsaturation;
   b. applying said mixture to the inner surface of the rocket motor casing:
   c. vulcanizing said mixture.
2. The process of claim 1 wherein Q" is —O—R—R' where R is $C_1$ to $C_6$ linear or branched alkylene or substituted or unsubstituted arylene and R' is $C_1$ to $C_6$ linear or branched alkenyl.
3. The process claim 2 wherein Q and Q' are the same or different and are methoxy, ethoxy, phenoxy, m-cresyloxy, p-cresyloxy and p-ethylphenoxy and Q" is vinyl, allyl, crotyl or o-allylphenoxy.
4. The process of claim 3 wherein Q and Q' are the same and are p-ethylphenoxy and Q" is o-allylphenoxy.
5. The process of claim 1 wherein said composition comprises
   1) from about 25 to about 50% by weight of said organic polymer fiber;
   2) from about 5 to about 25% by weight of said inorganic powder filler;
   3) from about 20 to about 60% by weight of said vulcanizable hydrocarbon elastomer; and
   4) said non-fluorinated phosphazene polymer wherein Q" is —O—R—R' where R is $C_1$ to $C_6$ linear or branched alkylene or substituted or unsubstituted arylene and R' is $C_1$ to $C_6$ linear or branched alkenyl.
6. The process of claim 5 wherein said composition comprises
   1) from about 30 to about 50% by weight of organic polymer fiber;
   2) from about 10 to about 25% by weight of said inorganic powder filler;
   3) from about 20 to about 55% by weight of said vulcanizable hydrocarbon elastomer; and
   4) said non-fluorinated phosphazene polymer wherein Q and Q' are the same or different and are methoxy, ethoxy, phenoxy, m-cresyloxy, p-cresyloxy and p-ethylphenoxy and Q" is vinyl, alkyl, crotyl or o-allylphenoxy.
7. The process of claim 6 wherein Q and Q' are the same and are p-ethylphenoxy and Q" is o-allylphenoxy.
8. The process of claim 5 wherein
   1) said organic polymer fiber has a fiber length of from about ¼" to about 1";

2) said inorganic powder filler has a surface area of from about 1 meter$^2$/gram to about 200 meter$^2$/gram;

3) said vulcanizable hydrocarbon elastomer is a natural rubber or a synthetic rubber.

9. The process of claim 8 wherein said organic polymer fiber is polybenzimidazole and said synthetic rubber is polybutadiene-1,3, polyisoprene, butadiene-styrene copolymer or butadiene-acrylonitrile copolymer.

10. The process of claim 9 wherein said vulcanizing is carried out for about 30 minutes to about 16 hours at about 170° F. to about 340° F.

* * * * *